Aug. 24, 1965  H. P. SCHELL  3,202,410
RESILIENT BUSHING
Filed Oct. 2, 1961

HERBERT P. SCHELL
INVENTOR.
BY John R. Faulkner
Clifford L. Sadler
ATTORNEYS

3,202,410
RESILIENT BUSHING

Herbert P. Schell, Detroit, Mich., assignor to Ford Motor Company, Dearborn, Mich., a corporation of Delaware
Filed Oct. 2, 1961, Ser. No. 142,229
4 Claims. (Cl. 267—1)

The present invention relates to resilient bushings and more particularly to such a bushing having low spring rate characteristics.

The use of a resilient bushing having inner and outer cylindrical sleeve members secured between pivotally oriented parts is well known. One common installation of such a bushing appears in motor vehicle construction where a suspension arm is pivotally connected to a vehicle body. These bushings are subjected to a variety of different loads and other requirements. Where the loads are high, it is usually necessary to have a relatively firm rubber layer between the inner and outer sleeve members. However, even though the loads are high, it may be desired to have a resilient bushing with a relatively low spring rate. Within the size limitations and other restrictions of a particular bushing application, it is not always possible to provide an elastic pivot bushing having both load carrying ability and a low spring rate.

In view of the state of the art, it is an object of the present invention to provide a resilient bushing that is characterized by its low spring rate.

More specifically, the present invention provides in one embodiment a resilient bushing having inner and outer cylindrical sleeve members with a one-piece rubber element interposed between such members. The rubber element has an annular ring at one end and a plurality of circumferentially spaced apart fingers extending in an axial direction from the ring. These fingers are cylindrical in their free state and are compressed into an oblong cross-sectional configuration when the rubber element is loaded between the inner and outer sleeves. Because the rubber is under considerable compression between the inner and outer members, the fingers will roll as well as deform upon pivoting. Such construction permits a resilient bushing having a significantly low spring rate while retaining its load carrying ability.

The objects and advantages of this invention will become amply apparent upon consideration of the following discussion and the accompanying drawings, in which.

Figure 2:
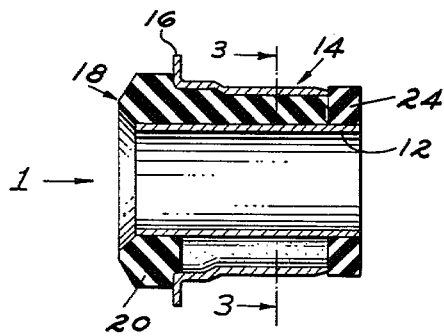
FIGURE 2 is an elevational view in section taken along section lines 2—2 of FIGURE 1.
Figure 1:
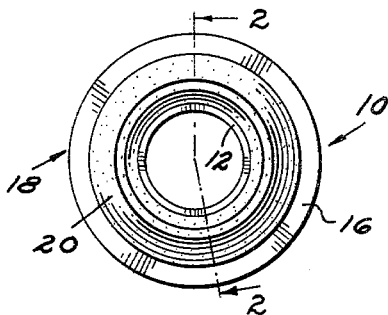
FIGURE 1 is an elevational view of a resilient bushing constructed in accordance with the presently preferred embodiment of this invention.
Figure 3:
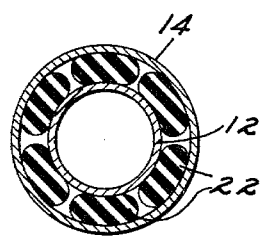
FIGURE 3 is an elevational view in section taken along section lines 3—3 of FIGURE 2.

Referring now to the drawings for a better understanding of this invention, a resilient bushing 10 constituting the presently preferred embodiment is shown. An inner cylindrical sleeve member 12 and an outer sleeve member 14 are provided. The outer sleeve 14 has a cylindrical body portion and a radial end flange 16 and is positioned concentric about the inner member 12. A rubber element 18 is situated between the inner and outer cylinders 12, 14.

Figure 4:
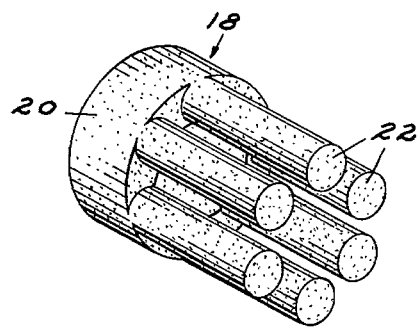
FIGURE 4 is a perspective of the resilient element of the bushing shown in its free state.

As shown in FIGURE 4, the rubber element 18 has a solid annular ring portion 20 at one end from which a series of circumferentially spaced apart fingers 22 extend in an axial direction. The fingers 22 have a cylindrical configuration in their uncompressed state. When the rubber element 18 is assembled between the sleeves 12, 14 of the bushing, it is in a high state of radial compression and the fingers 22 assume an oblong configuration as disclosed in FIGURE 2.

The end face of the ring 20 is chamfered and positioned about the inner sleeve 12 so that it is in alignment with the end of the inner sleeve 12. The inner limit of the ring 20 is positioned adjacent flange 16 of the outer cylinder 14. The fingers 22 extend axially from the ring 20 and terminate at the opposite end of the outer cylinder 14. Thus, the length of the fingers 22 is approximately equal to the cylinder member 14. The inner and outer cylindrical pieces 12 and 14 are dimensioned relative to the fingers 22 in order to place them in a high degree of compression.

To complete the assembly, a rubber ring 24 may be positioned about the protruding end of the inner cylindrical piece 12 in abutting engagement with the ends of the fingers 22.

In a typical installation of this resilient bushing, a suspension arm for an independent front suspension of a vehicle may be secured to the outer sleeve 14. The inner sleeve 12 is joined to a pivot shaft secured to a chassis member. As the suspension arm pivots in accordance with jounce and rebound wheel movement, the outer sleeve member 14 will rotate relative to the inner sleeve 12 and the fingers 22 will both roll and deform.

In a conventional resilient bushing, the rubber layer is continuously annular and any movement between the inner and outer cylindrical pieces occurs by deformation of the rubber in shear. In the present construction, the rolling of the fingers 22 reduces the shear loading and decreases the spring rate of the bushing assembly.

The foregoing description constitutes the presently preferred embodiment of this invention. Modifications and alterations may occur to those skilled in the art which will come within the scope and spirit of the following claims.

I claim:

1. A resilient bushing having concentric inner and outer sleeve members, a resilient piece interposed between said members, said piece having an annular portion at one end and a plurality of axially extending fingers protruding therefrom said fingers being loaded in compression.

2. A resilient bushing having concentric inner and outer sleeve members, a resilient piece interposed between said members, said piece comprising a solid ring portion and a plurality of circumferentially spaced apart fingers extending axially therefrom said fingers being located in compression.

3. A resilient bushing having concentric inner and outer sleeve members, a resilient piece interposed between said members, said piece having a solid annular ring at one end and a series of circumferentially spaced axially extending fingers, said fingers having a circular cross section in their free state and an oblong cross section when interposed between said inner and outer cylindrical members.

4. A resilient bushing having concentric inner and outer sleeve members, a resilient piece interposed between said members, said piece having a solid annular ring at one end and a series of circumferentially spaced apart axially extending fingers, said fingers being under a high degree of radial compression.

References Cited by the Examiner

UNITED STATES PATENTS

| | | | |
|---|---|---|---|
| 2,048,256 | 7/36 | Geyer | 287—85 |
| 2,729,442 | 1/56 | Neidhart | 267—57.1 X |
| 2,935,280 | 5/60 | Symonds | 248—24 |
| 3,006,703 | 10/61 | Bensch | 308—217 X |

FOREIGN PATENTS

| | | |
|---|---|---|
| 749,131 | 5/56 | Great Britain. |
| 1,188,894 | 3/59 | France. |

ARTHUR L. LA POINT, *Primary Examiner.*

RICHARD A. DOUGLAS, EUGENE G. BOTZ,
*Examiners.*